United States Patent
Tajima

(10) Patent No.: US 8,324,757 B2
(45) Date of Patent: Dec. 4, 2012

(54) POWER DISTRIBUTING SYSTEM, POWER TRANSMITTING DEVICE, POWER RECEIVING DEVICE, POWER TRANSMITTING METHOD AND POWER RECEIVING METHOD

(75) Inventor: Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 12/693,113

(22) Filed: Jan. 25, 2010

(65) Prior Publication Data
US 2010/0194189 A1 Aug. 5, 2010

(30) Foreign Application Priority Data
Feb. 2, 2009 (JP) ................ P2009-021544

(51) Int. Cl.
*H02J 1/10* (2006.01)

(52) U.S. Cl. .......................................... 307/43

(58) Field of Classification Search ............. 307/43
See application file for complete search history.

(56) References Cited

U.S. PATENT DOCUMENTS

| | | | | |
|---|---|---|---|---|
| 5,962,989 A | * | 10/1999 | Baker | 315/294 |
| 6,425,248 B1 | * | 7/2002 | Tonomura et al. | 60/641.8 |
| 7,146,256 B2 | * | 12/2006 | Hibi et al. | 700/286 |

FOREIGN PATENT DOCUMENTS

JP 2006-217689 8/2006

* cited by examiner

*Primary Examiner* — Robert L. DeBeradinis
(74) *Attorney, Agent, or Firm* — Finnegan, Henderson, Farabow, Garrett & Dunner, L.L.P.

(57) ABSTRACT

There is provided a power distributing system including at least one power transmitting device for transmitting power and at least one power receiving device for receiving the power transmitted from the power transmitting device. The power transmitting device includes a power generating means for generating power, and an information transmitting means for transmitting information containing power information related to the power generated by the power generating means and specific information on the power generating means, and the power receiving device includes an information receiving means for receiving the information transmitted by the information transmitting means and a power consumption control means for controlling consumption of power generated by the power generating means based on the information received by the information receiving means.

14 Claims, 4 Drawing Sheets

POWER DISTRIBUTING SYSTEM, POWER TRANSMITTING DEVICE, POWER RECEIVING DEVICE, POWER TRANSMITTING METHOD AND POWER RECEIVING METHOD

BACKGROUND OF THE INVENTION

1. Field of the Invention

The present invention relates to a power distributing system, a power transmitting device, a power receiving device, a power transmitting method, and a power receiving method.

2. Description of the Related Art

The configuration of a power transmission and distribution network with alternating current in the related art is roughly described below.

A power station has various energy sources such as water power, fire power, and electronic power, where the voltage tends to lower if power is directly supplied from the power station as the power station is often distant from the actual consuming regions such as households and companies. Therefore, a substation for transforming voltage is generally interposed between the power station and the consuming region. The substation usually exists in plurals between the power station and the consuming region, where a system from the power station to the consuming region is not limited to one, and one power station may supply power to a plurality of substations and one substation may receive power supply from a plurality of power stations. This is the reason for being called the power network.

The power station and the substation are connected by a power transmission line, and the distance of the power transmission line is so long that the direct current (DC) resistance of the power transmission line and the capacitance between the power transmission line and the ground may not be ignored. Therefore, in the related art, devisal has been made to reduce the current such as transmitting power with the voltage raised as much as possible. On the other hand, the substation basically has a structure of being able to receive power from a plurality of power stations (configuration in which power is supplied only from one power station also exists). This is so that when the requesting power of the user connected to the substation is increased, such requesting power can be covered with power from a plurality of power stations. Therefore, the load state is monitored at the substation on a constant basis, and the power generation amount of the power station is ultimately adjusted. A technique for minimizing the power distribution loss in the power transmission and distribution network is disclosed in, for example, Japanese Patent Application Laid-Open No. 2006-217689.

SUMMARY OF THE INVENTION

In the power transmission and distribution network currently being laid, the configurations of the power station, the substation, and the power transmission and distribution network connecting the power station and the substation are barely changed. In other words, the power station connected to the substation does not dynamically change on a daily basis.

However, with a power generating device using a so-called natural energy such as solar light, wind power, biomass, and the like the installation and removal thereof occur much more frequently than the power transmission and distribution network with alternating current in the present state. This situation is assumed to develop with the widespread use of a power generating device in the future. Therefore, the configurations of the power generating device, the power transformation device, and the power transmission and distribution network connecting the power generating device and the power transformation device may often be dynamically changed. And such dynamic changes may not be responded with the technique of the related art.

In light of the foregoing, it is desirable to provide a novel and improved power distributing system, a power transmitting device, a power receiving device, a power transmitting method, and a power receiving method, by which can be automated so that the power loss in the power transmission and distribution network is reduced.

To solve the issues mentioned above, according to an embodiment of the present invention, there is provided a power distributing system including at least one power transmitting device for transmitting power and at least one power receiving device for receiving the power transmitted from the power transmitting device. The power transmitting device includes a power generating means for generating power and an information transmitting means for transmitting information containing power information related to the power generated by the power generating means and specific information on the power generating means, the information is associated with the power generated by the power generating means, and the power receiving device includes an information receiving means for receiving the information transmitted by the information transmitting means, and a power consumption control means for controlling consumption of power generated by the power generating means based on the information received by the information receiving means.

According to such configuration, the power transmitting device transmits power and the power receiving device receives power transmitted from the power transmitting device. In the above-described power transmitting device, the power generating means generates power, and the information transmitting means transmits information containing power information related to the power generated by the power generating means and specific information on the power generating means, which is associated with the power generated by the power generating means. And in the above-described power receiving device, the information receiving means receives the information transmitted by the information transmitting means of the power transmitting device, and the power consumption control means controls consumption of the power generated by the power generating means based on the information received by the information receiving means. As a result, it can be automated so that the power loss in the power transmission and distribution network is reduced, by controlling the consumption of power based on the information transmitted from the power transmitting device.

Further, to solve the issues mentioned above, according to another embodiment of the present invention, there is provided a power transmitting device including a power generating means for generating power, and an information transmitting means for transmitting information containing power information related to the power generated by the power generating means and specific information on the power generating means, the information is associated with the power generated by the power generating means.

The information transmitting means may transmit information by superimposing the information on the power generated by the power generating means.

The specific information may be information on an absolute position.

The specific information may be information on a generation amount of carbon dioxide with respect to unit power.

The specific information may be information on a unit price per unit power.

The specific information may be information on the number of times power is transformed.

Furthermore, to solve the issues mentioned above, according to still another embodiment of the present invention, there is provided a power receiving device including a power receiving means for receiving power transmitted from a device for generating power, an information receiving means for receiving information containing power information related to the transmitted power and specific information on the device, which is transmitted from the device, and a power consumption control means for controlling consumption of the power received by the power receiving means based on the information received by the information receiving means.

The power receiving device may further include an information transmitting means for transmitting information containing all of the specific information received by the information receiving means.

The power consumption control means may perform a control so that power from the device having a closest absolute distance is preferentially consumed.

The power consumption control means may perform a control so that power from the device, of which unit price per unit power is lowest, is preferentially consumed.

The power consumption control means may perform a control so that power from the device, of which generation amount of carbon dioxide with respect to unit power is lowest, is preferentially consumed.

Further, to solve the issues mentioned above, according to another embodiment of the present invention, there is provided a power transmitting method comprising the steps of generating power in a power generating means, and transmitting information containing power information related to the power generated in the power generation step and specific information on the power generating means, the information is associated with the power generated in the power generation step.

Furthermore, to solve the issues mentioned above, according to still another embodiment of the present invention, there is provided a power receiving method including the steps of receiving power transmitted from a device for generating power, receiving information containing power information related to the transmitted power and specific information on the device, which is transmitted from the device, and controlling consumption of the power received in the power receiving step based on the information received in the information receiving step.

According to the embodiments of the present invention described above, a novel and improved power distributing system, a power transmitting device, a power receiving device, a power transmitting method, and a power receiving method can be provided, by which can be automated so that the power loss in the power transmission and distribution network is reduced. This is particularly effective in a system in which installation and removal of the power generating device and the power transformation device frequently occur.

DETAILED DESCRIPTION OF THE EMBODIMENTS

Figure 1:
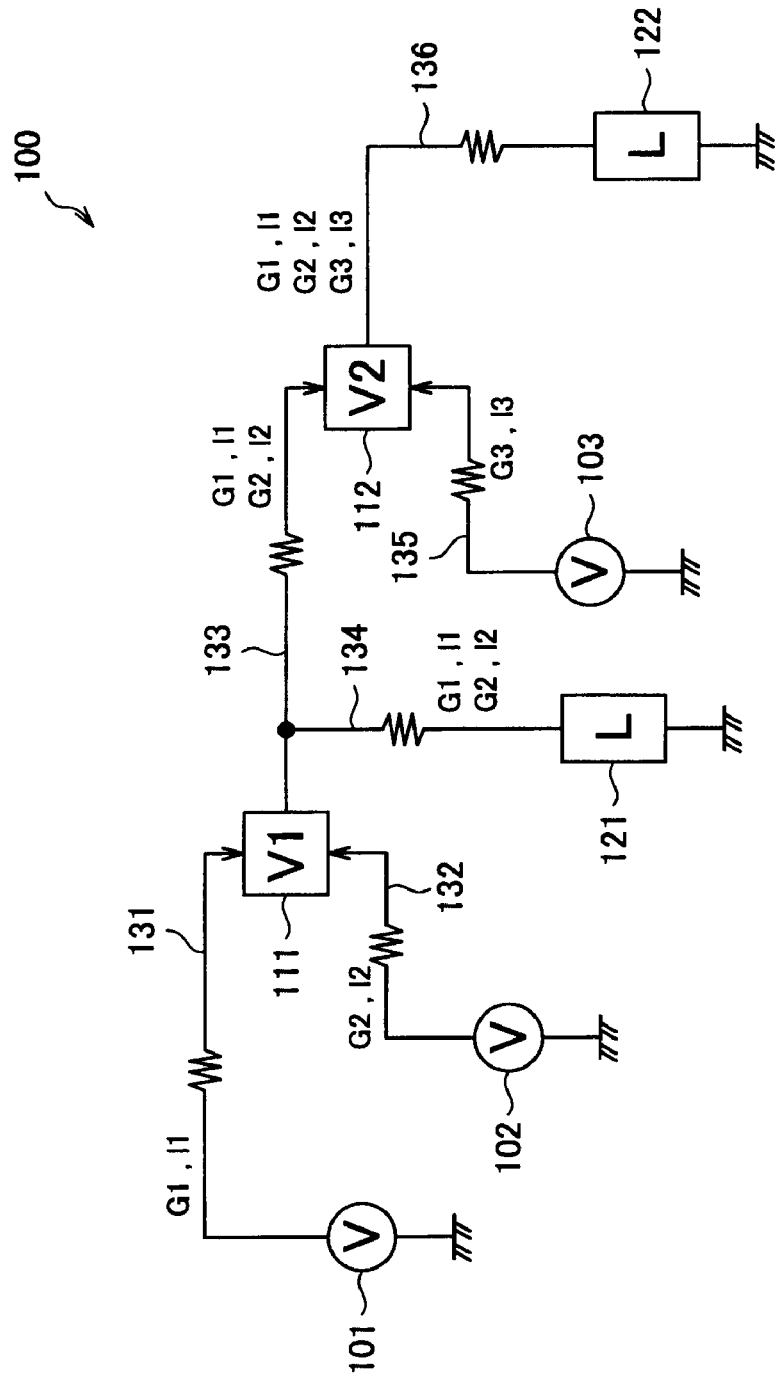
FIG. 1 is an explanatory view showing a configuration of a power distributing system 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiments of the present invention will be described in detail according to the following order.

[1] Example of configuration of power distributing system of the related art

[2] Configuration of power distributing system according to an embodiment of the present invention

[3] Configuration of power generating device according to an embodiment of the present invention

[4] Variation of load according to an embodiment of the present invention

[5] Summary

[1] Example of Configuration of Power Distributing System of the Related Art

Figure 4:
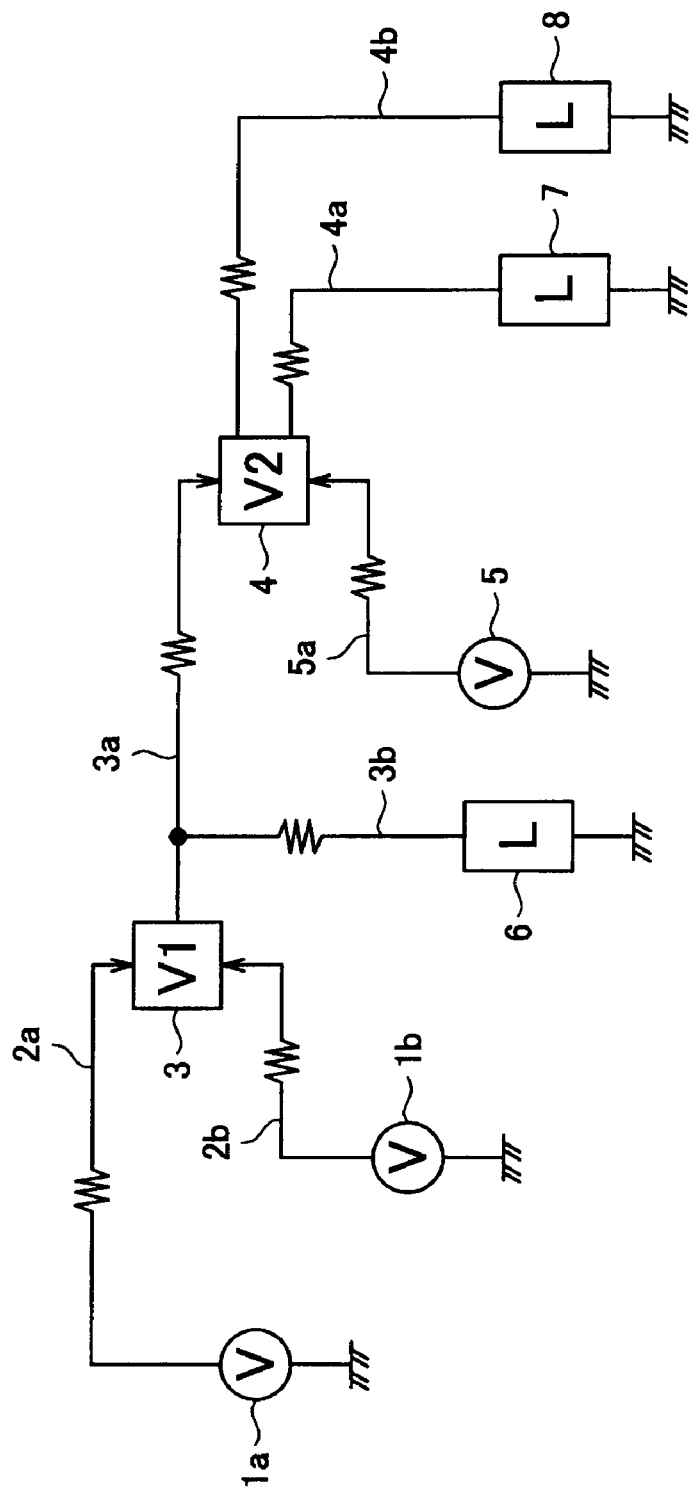
FIG. 4 is an explanatory view describing an example of a configuration of a power distributing system of the related art.

First, an example of a configuration of the power distributing system of the related art will be described before describing the preferred embodiments of the present invention. FIG. 4 is an explanatory view describing an example of the configuration of the power distributing system of the related art. The example of the configuration of the power distributing system of the related art will be described below using FIG. 4.

As shown in FIG. 4, the power distributing system of the related art includes, for example, power generating devices 1a, 1b, 5 for generating power, power transformation devices 3, 4 for transforming the voltage of the power generated by the power generating devices, loads 6, 7, 8 that consume the supplied power, and power transmission lines 2a, 2b, 3a, 3b, 4a, 4b, 5a for transmitting power.

The power generating device 1a is connected to the power transformation device 3 with the power transmission line 2a. The power generating device 1b is similarly connected to the power transformation device 3 with the power transmission line 2b. The power transformation device 3 is further connected to another power transformation device 4 with the power transmission line 3a, and the power transformation device 4 is further connected to the power generating device 5 different from the power transformation device 3 with the power transmission line 5a. The power transmission device 4 is also connected to the load 7 with the power transmission line 4a and to the load 8 with the power transmission line 4b.

In the power distributing system of the related art shown in FIG. 4, the amount of power distributed on each power transmission line is controlled automatically or manually by human hand according to the ability of the power generating device and the power transformation device, and the power consumption amount at the load. Therefore, in the power distributing system of the related art, it is premised on the fact that the system does not break down (e.g., certain power transmission line does not supply excessive power) by carrying out such control.

An example of the configuration of the power distributing system of the related art has been described above.

In the power distributing system of the related art shown in FIG. 4, loss of power is caused by the resistance of the power transmission line, and the capacitance between the power transmission line and the ground. Whether such loss of power is optimum is difficult to judge from the standpoint of power loss of the power distributing system as a whole. In judging whether the power loss of the power distributing system as a whole is optimum, information related to voltage and current of each unit of the power distributing system are to be monitored, and whether optimum or not is to be judged after collecting and analyzing the monitored information by some means.

In an embodiment of the present invention, therefore, specific information for identifying the power generating device and the power transformation device, and information related to the power distributed from the power generating device and the power transmission device are transmitted from the power generating device and the power transformation device. The purpose is to optimize the power loss of the power distributing system as a whole by receiving the information on the power transformation device or the load side that receive the power.

[2] Configuration of Power Distributing System According to an Embodiment of the Resent Invention A configuration of a power distributing system according to an embodiment of the present invention will now be described. FIG. 1 is an explanatory view showing the configuration of a power distributing system 100 according to an embodiment of the present invention. The configuration of the power distributing system 100 according to an embodiment of the present invention will be described using FIG. 1.

As shown in FIG. 1, the power distributing system 100 according to an embodiment of the present invention includes power generating devices 101, 102, 103, power transformation devices 111, 112, and loads 121, 122.

The power generating devices 101, 102, 103 internally generate power, and supply such power. The power generated by the power generating devices may be alternating current or may be direct current.

The power generating device 101 is connected to the power transformation device 111 with a power transmission line 131. The power generating device 101 supplies power I1, which is internally generated, to the power transformation device 111 through the power transmission line 131. Simultaneously with the supply of the power I1, the power generating device 101 transmits information related to the power generating device 101 and information G1 related to the power generated by the power generating device 101 to the power transformation device 111 through the power transmission line 131. When transmitting such information G1 from the power generating device 101 to the power transformation device 111, the information may be transmitted while being superimposed on the power distributed by the power transmission line 131, or the power transmission line 131 may also include a communication line different from the power line used to supply power, and information may be transmitted through the communication line. Furthermore, the transmission of the information G1 from the power generating device 101 is not limited to wired communication and may be carried out by wireless communication.

The content of the information transmitted from the power generating device 101 will be described in detail hereinafter, but may include identification information for identifying the power generating device, absolute position information, impedance information of the power transmission line between the power generating device and a specific power transformation node, and the like.

The power generating device 102 is connected to the power transformation device 111 with a power transmission line 132. Similar to the power generating device 101, the power generating device 102 supplies power I2, which is internally generated, to the power transformation device 111 through the power transmission line 132. Simultaneously with the supply of the power I2, the power generating device 102 transmits information related to the power generating device 102 and information G2 related to the power generated by the power generating device 102 to the power transformation device 111 through the power transmission line 132.

The power transformation device 111 receives the supply of power I1, I2 from the power generating devices 101, 102, transforms the voltage and outputs the same. The power transformation device 111 receives the supply of power from the power generating devices 101, 102, and also receives the information G1, G2 transmitted from the power generating devices 101, 102. The power transformation device 111 is connected to the load 121 with a power transmission line 134, and is connected to the power transformation device 112 with a power transmission line 133. The power transformation device 111 outputs power I1, I2 of which voltage is transformed, and supplies the same through the power transmission lines 133, 134, and also transmits the information G1, G2 transmitted from the power generating devices 101, 102.

Similar to the power generating device 101, when transmitting the information G1, G2 from the power generating device 111, the information may be transmitted while being superimposed on the power distributed by the power transmission lines 133, 134. In addition, when transmitting such information G1, G2 from the power transformation device 111, the power transmission lines 133, 134 may also include a communication line different from the power line used to supply power, and information may be transmitted through the communication line. Furthermore, the transmission of the information G1, G2 from the power generating device 111 is not limited to wired communication and may be carried out by wireless communication.

The load 121 receives the supply of power I1, I2 from the power transformation device 111 through the power transmission line 134. The load 121 receives the supply of power from the power transformation device 111 and also receives the information G1, G2 transmitted from the power transformation device 111, which is transmitted from the power generating devices 101, 102. At the load 121, power supplied from which power generating device is to be consumed for efficiency may be determined based on the information G1, G2 transmitted from the power generating devices 101, 102. Examples of the loads 121, 122 include electrical devices mainly used in households. Concrete examples of such electrical devices include a personal computer, a television set, a video recorder, a component stereo set, a refrigerator, a microwave oven, and other devices.

The power generating device 103 is connected to the power transformation device 112 with a power transmission line 135. Similar to the power generating devices 101, 102, the power generating device 103 supplies power I3, which is internally generated, to the power transformation device 112 through the power transmission line 135. Simultaneously with the supply of the power, the power generating device 103 transmits information related to the power generating device 103 and information G3 related to the power generated by the power generating device 103 to the power transformation device 112 through the power transmission line 135.

The power transformation device 112 receives the supply of power I1, I2, I3 from the power transformation device 111 and the power generating device 103, transforms the voltage and then outputs the same. The power transformation device 112 receives the supply of power I1, I2, I3 from the power transformation device 111 and the power generating device 103, and also receives the information G1, G2 transmitted from the power transformation device 111 and the information G3 transmitted from the power generating device 103. The power transformation device 112 is connected to the load 122 with a power transmission line 136. The power transformation device 112 outputs power I1, I2, I3 of which voltage is transformed, and supplies the same through the power transmission line 136, and also transmits the information G1, G2 transmitted from the power transformation device 111 and the information G3 transmitted from the power generating device 103.

The load 122 receives the supply of power I1, I2, I3 from the power transformation device 112 via the power transmission line 136. The load 122 receives the supply of power from the power transformation device 112 and also receives the information G1, G2 transmitted from the power transformation device 112, which information are transmitted from the power generating devices 101, 102, and the information G3 transmitted from the power generating device 103. At the load 122, power supplied from which power generating device is to be consumed for efficiency may be determined based on the information G1, G2 transmitted from the power generating devices 101, 102 and the information G3 transmitted from the power generating device 103.

In the system configured as in FIG. 1, the logical distance (in which impedance and loss of power transmission and distribution line are added to physical distance) to the power generating end of the power currently being consumed can be known at the load 122 by receiving the information G1, G2, and G3. Thus, if the logical distance is long (e.g., if distance between the power generating device 101, 102 and the load 122 is long), the consumption at the load 122 of the power generated at the relevant power generating end can be reduced. And the power consumption can be realized, which causes the power loss by the power transmission line in the power distribution system as a whole to be reduced, by performing a control so that the power having a short logical distance to the power generating end is preferentially consumed.

Further, the logical distance to the power source on the upstream side can be known also at the power transformation devices 111, 112. Therefore, unless the upstream is a single power source, from which power source to obtain the supplying power to the downstream side can be selected. In the power distributing system of the related art, the upstream power source (power station) is substantially fixed, and similar function can be implemented by specifying in advance to preferentially obtain the power from the power station having the closest logical distance. However, in the power distributing system of the related art, the upstream power source does not frequently change. Thus, if the power station having the closest logical distance is removed or a power station having the closest logical distance is newly arranged, a power station different from the previous power station is again set by human hand as the power station having the closest logical distance. In contrast, in the power distributing system 100 according to an embodiment of the present invention, the power transformation devices 111, 112 can receive the information transmitted from the power generating devices 101, 102, 103, as necessary. Therefore, power from which power generating device to consume for most efficiency can be determined from the received information in accordance with the new installation of the power generating device and the removal of the power generating device.

For example, consider a case in which the power generating device having the shortest logical distance is the power generating device 103 of the power generating devices 101, 102, 103, from which the power transformation device 112 receives supply of power. In this case, if the power generating device 103 is removed from the power distributing system 100, the power transformation device 112 receives the information transmitted from the power generating devices 101, 102, as necessary. Therefore, the power transformation device 112 can automatically determine which of the power generating devices 101, 102 is the power generating device having the shortest logical distance.

Here, the information transmitted by the power generating devices 101, 102, 103 may include, (1) information related to information communication and management of the power distributing system 100; (2) information related to physical specification of the power to be generated; and (3) information related to cost and expense of the power to be generated.

(1) The information related to information communication and management of the power distributing system 100 may include, for example, an address of the power generating device for executing communication with the power generating device and power generating end identification information for identifying the power generating device. In addition, the information related to information communication and management of the power distributing system 100 may include power generator identification information for identifying a power generator if the power generating device includes a plurality of power generators.

(2) The information related to physical specification of the power to be generated may include, for example, current output voltage, nominal output voltage, current output current, nominal output current, maximum output current, maximum output, current output, and position information such as latitude and longitude. In addition, the information related to physical specification of the power to be generated may include the impedance of a power transmission line between the power transmission line and a specific power transformation node.

(3) The information related to cost and expense of the power to be generated may include, for example, information such as unit price of the generating power, generation amount of carbon dioxide per unit power of the power being generated, the number of times power is generated (the number of times power is generated in power generating device is zero), and predicted power generation amount of the future. The predicted power generation amount of the future may include information on the time at which the power generation amount increases or decreases and the power generation amount thereof, for example if it is known that the power generation amount increases or decreases due to maintenance and the like.

The information transmitted by the power transformation devices 111, 112 may be the information transmitted by the power generating devices 101, 102, 103, or may be that in which information related to the power transformation devices 111, 112 is added to the information transmitted by the power generating devices 101, 102, 103. Furthermore, the information may be that in which the information transmitted by the power generating devices 101, 102, 103 is changed in the power transformation devices 111, 112. The information transmitted by the power transformation devices 111, 112 may include (1) information related to information communication and management of the power distributing system 100; (2) information related to physical specification of the power to be generated; and (3) information related to cost and expense of the power to be generated.

(1) The information related to information communication and management of the power distributing system 100 may include, for example, an address of the power transformation device for executing communication with the power transformation device and power generating end identification information for identifying the power transformation device. In addition, the information related to information communication and management of the power distributing system 100 may include addresses of the upstream power generating device and the power transformation device for executing communication with the upstream power generating device and the power transformation device.

(2) The information related to physical specification of the power to be generated may include, for example, current output voltage, nominal output voltage, current output current, nominal output current, maximum output current, maximum output, current output, and position information such as latitude and longitude. In addition, the information related to physical specification of the power to be generated may include, for example, the impedance of a power transmission line between the power transmission line and a specific power transformation node.

(3) The information related to cost and expense of the power to be generated may include, for example, information such as unit price of power obtained by resetting the unit price of the power generated by each power station and adding fees and costs required in the power transformation device to the reset unit price, generation amount of carbon dioxide per unit power of the generating power, the number of times power is transformed (increased by one every time the power is transformed in the power transformation device), and predicted power transformation amount of the future. The predicted power transformation amount of the future may include information on the time at which the power transformation amount increases or decreases and the power transformation amount thereof, for example if is known that the power transformation amount increases or decreases due to maintenance and the like.

When seen from the load and the substation of the terminating end, it is possible to know which power station or substation is the closest on the upstream side. Also, it is possible to determine through which path the received power was transmitted by analyzing the content of the information received at the load and the substation of the terminating end. In the load and the substation of the terminating end, not only the path of the received power, but also information related to the cost required at the time of generating the received power can be known. Therefore, the load and the substation of the terminating end have a structure in which the originating source of the received information can be tracked back to the power generating device, which is the power generating end.

The configuration of the power distributing system 100 according to an embodiment of the present invention has been described above. The configuration of the power generating device according to an embodiment of the present invention will be now described.

Figure 2:
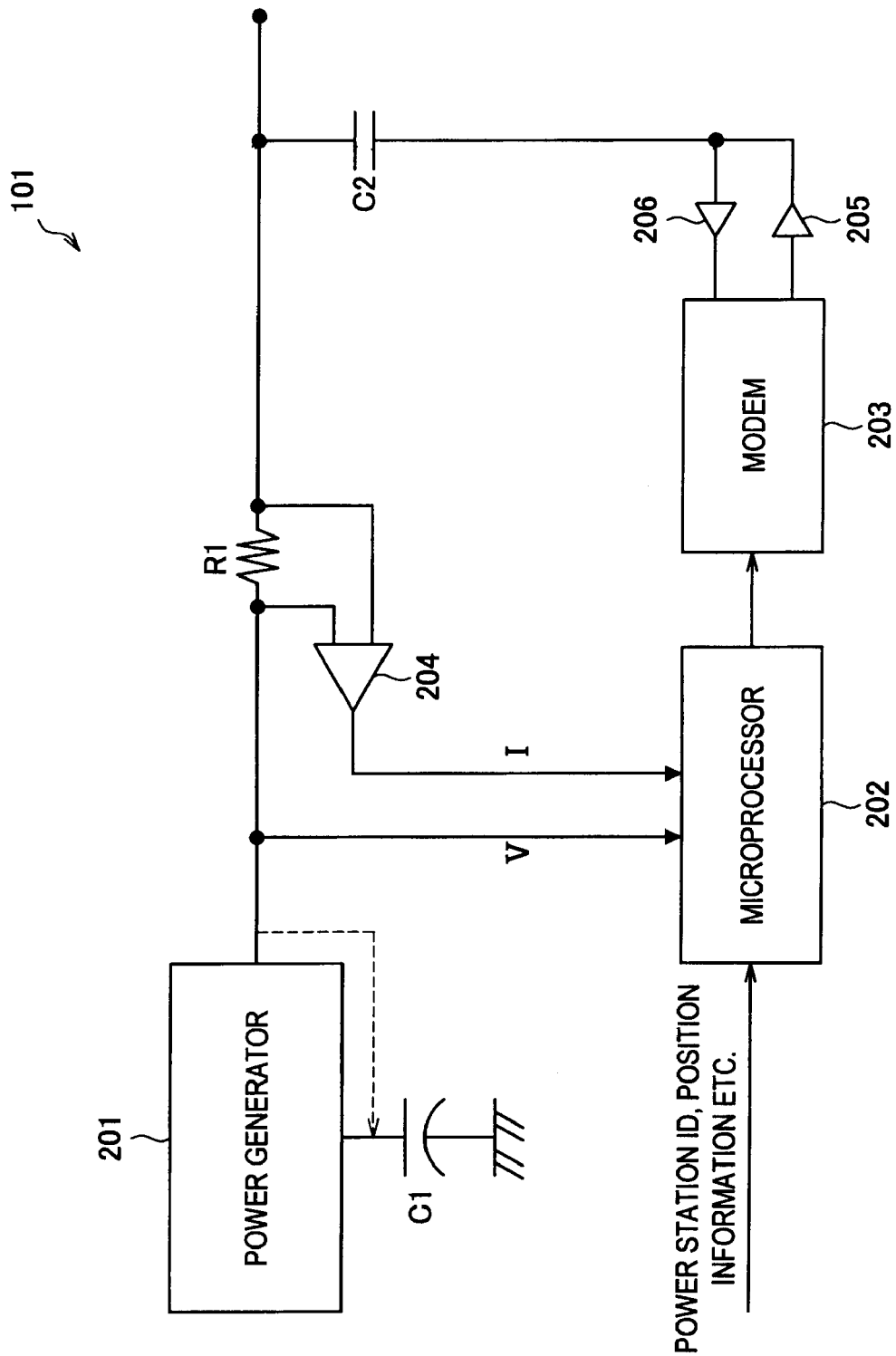
FIG. 2 is an explanatory view showing a configuration of a power generating device 101 according to an embodiment of the present invention.

[3] Configuration of Power Generating Device According to an Embodiment of the Present Invention FIG. 2 is an explanatory view showing a configuration of the power generating device 101 according to an embodiment of the present invention. The configuration of the power generating device according to an embodiment of the present invention will be described with reference to FIG. 2, taking the power generating device 101 as an example.

As shown in FIG. 2, the power generating device 101 according to an embodiment of the present invention includes a power generator 201, a microprocessor 202, a modem 203, a current measurement unit 204, line drivers 205, 206, capacitors C1, C2, and a resistor R1.

The power generator 201 generates power, where DC power is generated at the power generator 201 in the present embodiment. The information on a voltage value of the power generated by the power generator 201 is transmitted to the microprocessor 202. The status of the power generated by the power generator 201 is monitored by the minute by monitoring the storage status to the capacitor C1. A current value of the power generated by the power generator 201 is measured by the current measurement unit 204 from a potential difference of both ends of the resistor R1. The current value measured by the current measurement unit 204 is transmitted to the microprocessor 202.

The microprocessor 202 also receives, in addition to the information on the voltage value and the current value of the power generated by the power generator 201, (1) information related to information communication and management of the power distributing system 100, (2) information related to physical specification of the power to be generated, and (3) information related to cost and expense of the power to be generated, described above. Specifically, a power station ID for identifying the power generating device 101 from other power generating devices, the position information of the power generating device 101, and information related to the power generating device 101 and the like are transmitted to the microprocessor 202. The microprocessor 202 puts the above information together and transmits the same to the modem 203.

The modem 203 modulates the information transmitted from the microprocessor 202 into a format in which the information can be superimposed on the power generated by the power generator 201. In the present embodiment, the modem 203 performs modulation/demodulation of the signal in the transmission and reception of information signal carried out using a sufficiently high frequency band. The information modulated at the modem 203 is superimposed on the power generated by the power generator 201 via the line driver 205 and the capacitor C2, and output as the information G1 from the power generating device 101.

When the information G1 from the power generating device 101 is output while being superimposed on the power, the invention described in Japanese Patent Application Laid-Open No. 2008-123051 can be used, which is an invention by the same inventor as the inventor of the present application. When the information G1 from the power generating device 101 is output while being superimposed on the power, the power and the information may be packetized, and the power packet and the information packet may be transmitted in time-division as in the relevant invention. The power can be received and consumed at the power consuming source by generating and transmitting the packet at the power generating source. The method of superimposing the information on the power is obviously not limited to such example.

The configuration of the power generating device 101 according to an embodiment of the present invention has been described above. The power generating device 101 has been described, by way of example, for the configuration of the power generating device according to an embodiment of the present invention, but the power generating devices 102, 103 may also have a configuration similar to the power generating device 101. Next, the configuration of the load 121 according to an embodiment of the present invention will be described.

[4] Configuration of Load According to One Embodiment of the Present Invention

Figure 3:
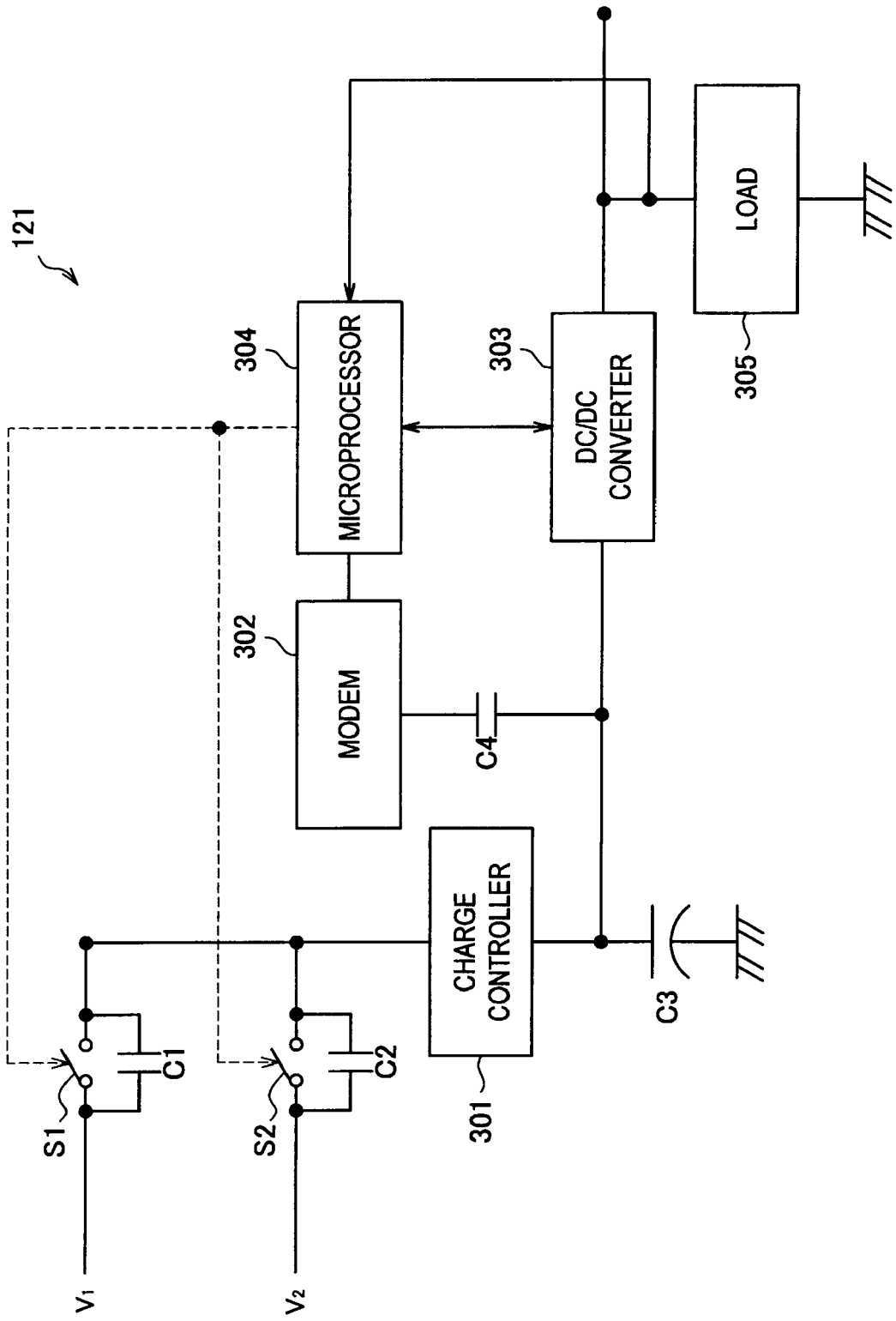
FIG. 3 is an explanatory view showing a configuration of a load 121 according to an embodiment of the present invention.

FIG. 3 is an explanatory view showing a configuration of the load 121 according to one embodiment of the present invention. The configuration of the load according to an embodiment of the present invention will be described with reference to FIG. 3, taking the load 121 as an example.

The load 121 is an example of the power receiving device according to an embodiment of the present invention. The power generated at the voltage V1 in the power generating device 101 and the power generated at the voltage V2 in the power generating device 102 are supplied to the load 121. As shown in FIG. 3, the load 121 according to an embodiment of the present invention includes a charge controller 301, a modem 302, a DC/DC converter 303, a microprocessor 304, a load 305, capacitors C1, C2, C3, C4, and switches S1, S2.

The charge controller 301 controls the charging of the capacitor C3 which is used in the operation of the load 121 when the power from the power generating devices 101, 102 is not supplied, by use of the supplied power. The over-charge to the capacitor C3 is prevented by the charge controller 301.

The modem 302 performs modulation/demodulation of the information G1, G2 transmitted from the power generating devices 101, 102. The information G1, G2 transmitted from the power generating devices 101, 102 may be, for example, (1) information related to information communication and management of the power distributing system 100, (2) information related to physical specification of the power to be generated, and (3) information related to cost and expense of the power to be generated. In the present embodiment, the modem 302 performs modulation/demodulation of the signal in the transmission and reception of information signal performed using a sufficiently high frequency band, similar to the modem 203. The information demodulated by the modem 302 is transmitted to the microprocessor 304.

The DC/DC converter 303 converts the power supplied from the power generating devices 101, 102 through the power network into the current/voltage required by the load 305.

The microprocessor 304 receives the information G1, G2 demodulated by the modem 302, and controls the switching operation of the switches 51, S2 based on the received information G1, G2. Further, the microprocessor 304 monitors the power consumption status in the load 305, and controls the switching operation of the switches S1, S2 in accordance with the power consumption status in the load 305. The load 305 actually consumes the power supplied from the power generating devices 101, 102. For the switches 51, S2, various types of switching elements such as a MOSFET (Metal-Oxide-Semiconductor Field-Effect Transistor) may be used.

For example, consider a case in which the information G1, G2 demodulated by the modem 302 is received by the microprocessor 304 when the powers from both power generating devices 101, 102 are supplied to the load 121. In this case, if it is known that the absolute distance to the power generating device 101 is shorter than that to the power generating device 102, the microprocessor 304 may perform a control to close the switch 51 and open the switch S2 so that the power supplied from the power generating device 101 is preferentially consumed.

The microprocessor 304 may perform a control to close the switch 51 and open the switch S2 so that the power supplied from the power generating device 101 is preferentially consumed, for example if it is known that the generation amount of carbon dioxide with respect to unit power of the power supplied from the power generating device 101 is less than that of the power supplied from the power generating device 102 as a result of receiving at the microprocessor 304 the information G1, G2 demodulated by the modem 302.

The microprocessor 304 may perform a control to close the switch S1 and open the switch S2 so that the power supplied from the power generating device 101 is preferentially consumed, for example if it is known that the unit price per unit power of the power supplied from the power generating device 101 is lower than that of the power supplied from the power generating device 102 as a result of receiving at the microprocessor 304 the information G1, G2 demodulated by the modem 302.

Moreover, the microprocessor 304 may perform a control to close the switch S1 and open the switch S2 so that the power supplied from the power generating device 101 is preferentially consumed, for example if it is known that the number of times power is transformed of the power supplied from the power generating device 101 is smaller than that of the power supplied from the power generating device 102 as a result of receiving at the microprocessor 304 the information G1, G2 demodulated by the modem 302.

Furthermore, if it is known that the power generation amount of the power generating device 101 lowers during a predetermined period starting from a certain time point due to maintenance of the device etc. as a result of receiving at the microprocessor 304 the information G1, G2 demodulated by the modem 302, the switching of the switches S1, S2 may be controlled so that the power supplied from the power generating device 101 is preferentially consumed up to the relevant time point and, when the corresponding time point is reached, the power supplied from the power generating device 101 is preferentially consumed during the relevant period.

By setting a rule of switching control of the switches S1, S2 by the microprocessor 304 in advance in the microprocessor 304, the switching of the switches S1, S2 can be controlled in accordance with the rule, Further, by arbitrarily setting a rule of switching control of the switches S1, S2 by the microprocessor 304 according to the usage status of the load 121, the switching of the switches S1, S2 may be controlled in accordance with the rule Needless to say, the conditions for the switching control of the switches S1, S2 by the microprocessor 304 are not limited to the above-described examples.

In the configuration shown in FIG. 3, the capacitors C1, C2 are arranged in parallel to the switches S1, S2, respectively. The capacitors C1, C2 shield the DC current, and pass the information signal performed using a sufficiently high frequency band. Therefore, the information transmitted through the power network from the power generating devices 101, 102 can be received even if the switches S1, S2 are opened.

In the configuration shown in FIG. 3, the capacitor C3 is arranged inside the load 121 as a power supply, but needless to say, the present invention is not limited to such example. For example, a secondary battery may be arranged inside the load 121 in place of the capacitor C3 or in addition to the capacitor C3.

The configuration of the load 121 according to an embodiment of the present invention has been described above. In the present embodiment, the load 121 has been illustratively described as an example of the power receiving device according to the embodiment of the present invention, but the power transformation devices 111, 112 according to an embodiment of the present invention are also examples of the power receiving device according to the embodiment of the present invention. The power transformation devices 111, 112 receive supply of power generated by the power generating devices 101, 102, 103, transforms the power into the predetermined voltage/current, and outputs the same. Here, the power supplied from which power generating device is to be preferentially transformed and output to the power network of post-stage may be determined in the power transformation devices 111, 112, in view of the power generation efficiency of the power supplied from the power generating devices 101, 102, 103. In this case, to transmit information to the power network of post-stage, a modem for modulating and demodulating the information may be provided in the power transformation devices 111, 112.

[5] Summary

With such configuration of power generating device and the load, in the power generating device, it becomes possible to modulate the information related to the self-generated power and the information related to the power generating device itself such as position information by the modem and to output the information by superimposing the information on the power supplied from the power generating device. Further, in the load, it is possible to determine the power from which power generating device is to be used for most efficiency, by receiving the supply of power from the power generating device and transforming the voltage and outputting the same, and also by receiving the information transmitted from the power generating device and demodulating the information by the modem and analyzing the received information.

As described above, according to an embodiment of the present invention, the power is supplied from the power generating device, and the power generated by the power generating device and the information related to the power generating device itself such as position information are transmitted. In the power transformation device that performs power transformation and the load that consumes power, it is possible to determine the power generated by which power generating device is to be used so that power can be supplied or consumed at most satisfactory efficiency, by receiving the information transmitted from the power generating device.

It should be understood by those skilled in the art that various modifications, combinations, sub-combinations and alterations may occur depending on design requirements and other factors insofar as they are within the scope of the appended claims or the equivalents thereof.

For example, in the above-described embodiment, the DC power is generated in the power generating device and information is transmitted from the power generating device in such a manner that the information is superimposed on the DC power, but needless to say, the present invention is not limited thereto. For example, various types of information may be transmitted by a system different from that of the DC power generated by the power generating device. In such configuration, the transmission of various types of information may be performed by wired or wireless communication.

Further, in the above-described embodiments, the DC power is generated in the power generating device and power transformation of the DC power is performed by the power transformation device, but the present invention is not limited to such example. And the AC power may be generated in the power generating device, and the AC power may be transformed in the power transformation device. Even in the case of distributing the AC power, various types of information may be transmitted while being superimposed on the power, or the information may be transmitted by a system different from that of the power supply. In the configuration of transmitting the information by a system different from that of the power supply, the transmission of various types of information may be performed by wired or wireless communication.

The present application contains subject matter related to that disclosed in Japanese Priority Patent Application JP 2009-21544 filed in the Japan Patent Office on 2 Feb. 2009, the entire content of which is hereby incorporated by reference.

What is claimed is:

1. A power distributing system, comprising:
at least one power transmitting device for transmitting power; and
at least one power receiving device for receiving the power transmitted from the power transmitting device,
wherein the power transmitting device includes,
a power generating means for generating power, and
an information transmitting means for transmitting information to a power transformation device, the information contains power information related to the power generated by the power generating means and specific information on the power generating means, and the information is associated with the power generated by the power generating means, and
the power receiving device includes,
an information receiving means for receiving the information transmitted by the information transmitting means from the power transformation device or other power transformation devices, and
a power consumption control means for controlling consumption of power generated by the power generating means based on the information received by the information receiving means.

2. A power transmitting device comprising:
a power generating means for generating power; and
an information transmitting means for transmitting information to a power transformation device, wherein the information contains power information related to the power generated by the power generating means and specific information on the power generating means, and the information is associated with the power generated by the power generating means.

3. The power transmitting device according to claim 2, wherein the information transmitting means transmits information by superimposing the information on the power generated by the power generating means.

4. The power transmitting device according to claim 2, wherein the specific information is information on an absolute position.

5. The power transmitting device according to claim 2, wherein the specific information is information on a generation amount of carbon dioxide with respect to unit power.

6. The power transmitting device according to claim 2, wherein the specific information is information on a unit price per unit power.

7. The power transmitting device according to claim 2, wherein the specific information is information on the number of times power is transformed.

8. A power receiving device comprising:
a power receiving means for receiving power transmitted from a device for generating power;
an information receiving means for receiving information containing power information related to the transmitted power and specific information on the device, which is transmitted from the device, the information received from a power transformation device; and
a power consumption control means for controlling consumption of the power received by the power receiving means based on the information received by the information receiving means.

9. The power receiving device according to claim 8, further comprising an information transmitting means for transmitting information containing all of the specific information received by the information receiving means.

10. The power receiving device according to claim 8, wherein the power consumption control means performs a control so that power from the device having a closest absolute distance is preferentially consumed.

11. The power receiving device according to claim 8, wherein the power consumption control means performs a control so that power from the device, of which unit price per unit power is lowest, is preferentially consumed.

12. The power receiving device according to claim 8, wherein the power consumption control means performs a control so that power from the device, of which generation amount of carbon dioxide with respect to unit power is lowest, is preferentially consumed.

13. A power transmitting method, comprising the steps of:
generating power in a power generating means; and
transmitting information to a power transformation device, wherein the information contains power information related to the power generated in the power generation step and specific information on the power generating means, and the information is associated with the power generated in the power generation step.

14. A power receiving method, comprising the steps of:
receiving power transmitted from a device for generating power;
receiving information containing power information related to the transmitted power and specific information on the device, which is transmitted from the device, the information received from a power transformation device; and
controlling consumption of the power received in the power receiving step based on the information received in the information receiving step.

* * * * *